Precondition tantalum particles by heating at temperature above 2200°C. to remove carbon impurities from at least the surface of the particles.

↓

Powderizing conditioned particles.

↓

Sintering particles at temperature from 2000°C. to 2200°C. to form porous body

↓

Anodizing porous tantalum body to form oxide film thereon.

↓

Dipping anodized porous tantalum body in manganese nitrate solution and heating at high temperature to form semi-conductive oxide layer, repeated several times and followed by reanodization and redipping and heating.

↓

Form conductive coating on so treated tantalum body.

↓

Attach leads and enclose in casing.

↓

Porous, reducible-oxide solid capacitor.

INVENTORS.
RICHARD E. GLUYAS
STANLEY MEGLIC
BY Leo A. Plum, Jr.
ATTORNEY

United States Patent Office 3,299,326
Patented Jan. 17, 1967

3,299,326
SOLID ELECTROLYTIC CAPACITOR WITH POROUS SINTERED ELECTRODE OF THERMALLY PRETREATED ANODIZABLE METAL PARTICLES
Richard E. Gluyas, North Olmsted, and Stanley Meglic, Cleveland, Ohio, assignors to Union Carbide Corporation, a corporation of New York
Filed Feb. 18, 1963, Ser. No. 259,359
16 Claims. (Cl. 317—230)

This invention relates to solid electrolytic capacitors and more particularly to such capacitors having anodically filmed electrodes and to methods of manufacturing such capacitors.

In general, a solid electrolytic capacitor comprises a porous anode body formed of compressed adherent particles of an anodizable or film-forming metal, a dielectric film produced by anodization on the exposed surfaces of the particles, a layer of semi-conductive oxide on the dielectric film, and an electrically conductive covering cathode layer on the layer of semi-conductive oxide. The porous electrode body is usually produced by compressing and sintering particles of a film-forming metal, for example, tantalum, aluminum, tungsten, columbium, hafnium, titanium and zirconium until the particles are bonded into a rigid porous mass. After sintering the particles together, the porous body so formed is immersed in an electrolyte bath and anodized to produce a dielectric or anodic film which forms a barrier over the entire surface of the porous body. When the anodic film is formed, the filmed electrode is removed from the electrolyte and impregnated with a semi-conductive material which is pyrolytically or chemically convertible to a semi-conductive oxide in intimate contact with the anodic film. Following impregnation, the electrode is subjected again to the application of voltage in an electrolyte bath to heal and eliminate imperfections in the barrier film. The electrode is further impregnated with the semi-conductive oxide, reformed, and then a conducting deposit is formed over the semi-conductive layer by impregnating the electrode with a conducting dispersion such as graphite in water. Next, the water is driven off and the resulting carbon coated outer surface of the electrode is then covered with metal forming the cathode. Suitable leads to the external metallic cover and to the porous body complete the electrical connections to the capacitor.

Solid electrolytic capacitors have been manufactured in the above manner to withstand working operating voltages as high as about 75 volts. At higher working voltages, the dielectric film barrier breaks down producing excessive leakage currents that render the capacitor useless. The point or points at which the dielectric film barrier breaks down probably occur at locations where the surface layer of the porous body includes an impurity, for example carbon in the form of a carbide. At such a location, the dielectric is either imperfectly formed or formed with insufficient thickness to withstand relatively high working voltages.

One possible way to decrease the carbon impurity concentration in the porous body is to sinter the particles forming the body at higher-than-normal temperatures. Oxygen occluded in the particles is driven out at high temperatures and combines with carbon impurities, thereby purifying the particles. At higher temperatures, however, the particles sinter into a more dense body thereby decreasing the surface area of the porous body. Because capacitance is directly related to surface area, any decrease in surface area deleteriously affects the unit capacitance or capacitance/gram of the capacitor. Therefore, purifying the porous body by high temperature sintering alone is not desirable; higher unit capacitance usually being more preferred than higher working voltages in the manufacture of solid electrolytic capacitors if one or the other must be sacrificed.

It is an object of the present invention to provide a solid electrolytic capacitor having an increased working voltage limit without a decreased unit capacitance. Another object is to provide a method of manufacturing such a capacitor. Still another object is to provide an improved solid electrolytic capacitor having an increased working voltage limit and an increased unit capacitance. These and other objects and advantages will be apparent from consideration of the following description.

The method of manufacturing an improved solid electrolytic capacitor according to the present invention comprises the steps of: thermally treating particles of an anodizable metal at a high temperature to condition the particles; pressing and sintering these particles into a porous sintered anode body; producing a dielectric film barrier on the exposed surfaces of the porous sintered body by anodization; producing a semi-conductive oxide layer on the dielectric film barrier; and providing a coherent cathode layer of electrically conductive particles on the semi-conductive oxide layer. Suitable metals having anodizable or film-forming characteristics include tantalum, aluminum, tungsten, columbium, hafnium, titanium and zirconium; tantalum metal being preferred. The present invention will be described in greater detail in terms of the manufacture of a solid tantalum electrolytic capacitor but it should be understood that the other above-listed metals may be substituted for tantalum.

The drawing is a diagrammatic representation of the method of this invention.

Thermally treating tantalum particles, prior to pressing and sintering them into an anode, permits producing a more uniform and substantial dielectric film barrier on the exposed surfaces of the later-formed anode. The dielectric film barrier produced on an anode formed from these conditioned tantalum particles is more stable than can be produced by other manufacturing methods. Thermally treating the tantalum particles in an evacuated atmosphere is preferred to prevent the back-diffusion of impurities into the particles during thermal treatment. An "evacuated atmosphere" as used herein means a pressure below ambient atmospheric pressure. A flowing inert gas, either at or below atmospheric pressure can also be used to aid in impurity removal during thermal treatment.

It is believed that a more suitable dielectric film barrier is produced on an anode composed of thermally treated particles because the particle conditioning purifies a surface layer several thousand angstroms thick in each particle. Particle conditioning, however, does not appear to result in a significant decrease in the overall carbon content of the porous sintered tantalum anode vis-a-vis the overall carbon content of a tantalum anode formed of unconditioned particles. Thermally treating the tantalum particles apparently reduces the particle surface concentration of tantalum carbides which adversely affect the formation of a suitable dielectric film barrier on the anode.

To simplify thermally treating the particles, it is preferred that the particles be pressed into compact pellets. Tantalum particles are most easily thermally treated in pellets having thicknesses of about 0.1 inch but pellets having thicknesses up to about 0.3 inch have been successfully thermally treated. Tantalum pellets having greater thicknesses require an extended period of thermal treatment that is impractically long.

After thermally treating the particles in pellet form, the pellets must be powderized to form the conditioned particles which are then pressed and sintered into porous sintered anodes. To powderize thermally treated tantalum pellets it is necessary to embrittle the tantalum by hydrogenation. Embrittled pellets are then milled to size and the conditioned particles so formed dehydrogenated to reduce their hydrogen content.

When a thermally treated pellet is powderized and the resulting conditioned particles pressed and sintered into an anode, the particle may become contaminated with impurities, for example carbon. The problem of carbon contamination during these steps is particularly acute where the conditioned particles originate from a relatively thick pellet which is difficult to thermally treat adequately. Because most carbon impurities are removable by reaction with oxygen, it is possible to counteract carbon contamination by increasing the particle surface oxygen content of the thermally treated pellet prior to hydrogenation, for example by anodization. After increasing the particle surface oxygen content, the sintering of the later-formed porous anode will cause this added oxygen to combine with and remove the carbon impurities.

Preferably, the thermally treated tantalum pellet should be anodized under conditions suitable for raising the particle oxygen content to about 0.18%. In general, it is desirable to increase the particle surface oxygen content as much as possible, but it has been found that an oxygen content greater than about 0.18% deleteriously affects the suitability of tantalum for use as a porous sintered anode.

By pressing particles of an anodizable metal into a compact pellet, thermally treating the pellet to condition the particles, powderizing the pellet, and pressing and sintering the conditioned particles into a porous sintered anode, the present method of manufacture produces a high purity anode body. The present method of manufacture also permits using an acceptably low sintering temperature, thereby preventing a decrease in the anode unit capacitance. The normal sintering temperature for tantalum is about 2000° C. to 2200° C. and the range of thermal treating temperatures for tantalum is between about 2200° C. and the melting point of tantalum (about 3000° C.) with a thermal treating temperature of about 2400° C. to 2600° C. being preferred.

Solid tantalum electrolytic capacitors manufactured as described above, employing the preferred thermal treating and sintering temperatures, are able to withstand working voltages of 100 volts whereas capacitors of similar size which have been manufactured by other methods are able to withstand operating voltages only up to about 75 volts. In addition to providing a capacitor able to withstand increased working voltages, the present invention provides a porous sintered anode having increased unit capacitance. For example, a typical porous sintered tantalum anode manufactured by other methods may have a unit capacitance of about 1800 microcoulombs/gram. A porous sintered tantalum anode manufactured by the present method, however, has a unit capacitance of about 2250 microcoulombs/gram. This 25% increase in unit capacitance is unexpected inasmuch as the overall impurity content and the particle size distribution of the powder manufactured by the present method are not significantly different from those of other methods. Nevertheless, the thermal treatment of the tantalum particles prior to sintering them into a porous anode does result in this increased capacitance. Consequently, the present method of manufacture not only provides a solid electrolyte capacitor with an increased working voltage range, but also provides such a capacitor that is smaller for a particular capacitance rating than ordinary capacitors. This latter feature is particularly valuable because solid electrolytic capacitors are commonly used in miniaturized circuits.

It is to be understood that while preferred embodiments of the invention have been described above, there are numerous other arrangements that may be devised by those skilled in the art which are within the scope of the invention.

What is claimed is:

1. A method of manufacturing a solid electrolytic capacitor comprising thermally treating particles of an anodizable metal in a high temperature evacuated atmosphere to form volatile compounds of impurities on said particles, including the heating of said particles at the volatilization temperature of said impurity compounds for removal thereof; sintering said particles into a porous sintered body; producing a genetic dielectric film on the exposed surfaces of said sintered particles; producing a reducible semi-conductive oxide layer on said dielectric film; and applying a coherent layer of electrically conductive material particles on said semi-conductive oxide layer.

2. A method according to claim 1 wherein the anodizable metal is tantalum.

3. A method according to claim 2 wherein the tantalum particles are thermally treated at a temperature between about 2200° C. and the melting point of tantalum and wherein the sintering of said thermally treated particles into a porous sintered body takes place at a lower temperature than the thermal treatment temperature.

4. A method of manufacturing a solid electrolytic capacitor comprising thermally treating a pellet consisting essentially of particles of an anodizable metal in a high temperature evacuated atmosphere to form volatile compounds of impurities on said particles, including the heating of said particles at the volatilization temperature of said impurity compounds for removal thereof; powderizing said pellet to form thermally treated particles; sintering said thermally treated particles into a porous sintered body, said sintering being conducted at a lower temperature than the thermal treatment temperature; producing a genetic dielectric film on the exposed surfaces of said porous sintered body by anodization; producing a reducible semi-conductive oxide layer on said dielectric film; and applying a coherent layer of electrically conductive material on said semi-conductive oxide layer.

5. A method according to claim 4 wherein the anodizable metal is tantalum.

6. A method according to claim 5 wherein the pellet of tantalum is thermally treated at a temperature between about 2200° C. and the melting point of tantalum.

7. A method according to claim 5 wherein the pellet of tantalum is thermally treated at a temperature between about 2400° C. and 2600° C. and wherein the sintering temperature is from 2000° C. to 2200° C.

8. A method of manufacturing a solid electrolytic capacitor comprising thermally treating a pellet consisting essentially of particles of an anodizable metal in a high temperature evacuated atmosphere to form volatile compounds of carbon impurities on said particles, including the heating of said particles at the volatilization temperature of said carbon compounds for removal thereof; anodizing said pellet to increase the particle surface oxygen content of said pellet; powderizing said pellet to form thermally treated particles; sintering said thermally treated particles into a porous sintered body; producing a genetic dielectric film on the exposed surfaces of said porous sintered body by anodization; producing a reducible semi-conductive oxide layer on said dielectric film; and applying a coherent layer of electrically conductive material on said semi-conductive oxide layer.

9. A method according to claim 8 wherein the anodizable metal is tantalum.

10. A method according to claim 9 wherein the pellet is preanodized sufficiently to increase the particle oxygen content of said pellet to about 0.18% oxygen by weight.

11. A method according to claim 9 wherein the pellet of tantalum is thermally treated at a temperature between about 2200° C. and the melting point of tantalum and wherein the sintering temperature is from 2000° C. to 2200° C.

12. A method according to claim 9 wherein the pellet of tantalum is thermally treated at a temperature between about 2400° C. and 2600° C.

13. A solid electrolytic capacitor comprising in combination a sintered porous body formed of sintered particles of anodizable metal, said particles having reduced surface concentrations of carbides; a genetic dielectric film formed on the exposed surfaces of said sintered particles; a reducible semi-conductive oxide layer on the dielectric film; and an electrically conductive coating on the semi-conductive oxide layer.

14. A solid electrolytic capacitor according to claim 13 in which the sintered porous body is composed of tantalum.

15. A method of manufacturing a solid electrolytic capacitor comprising thermally treating tantalum particles at a temperature of at least 2200° C. to purify said particles; sintering said purified particles into a porous sintered body; producing a genetic dielectric film on the exposed surfaces of said sintered particles by anodization; producing a reducible semi-conductive oxide layer on said dielectric film; and applying a coherent layer of electrically conductive material on said semi-conductive oxide layer.

16. A method according to claim 15 wherein the thermal treatment takes place under an inert atmosphere.

References Cited by the Examiner
UNITED STATES PATENTS

| | | | |
|---|---|---|---|
| 1,330,581 | 2/1920 | Croulson | 317—230 |
| 2,299,228 | 10/1942 | Gray et al. | 317—230 |
| 3,166,693 | 1/1965 | Haring et al. | 317—230 |

JOHN W. HUCKERT, *Primary Examiner.*

J. D. KALLAM, *Assistant Examiner.*